Aug. 25, 1959 A. MARCHETTI 2,901,090
CARRYING-FRAME CONVEYOR FOR TIERED DRIERS
Filed Oct. 18, 1957 3 Sheets-Sheet 2
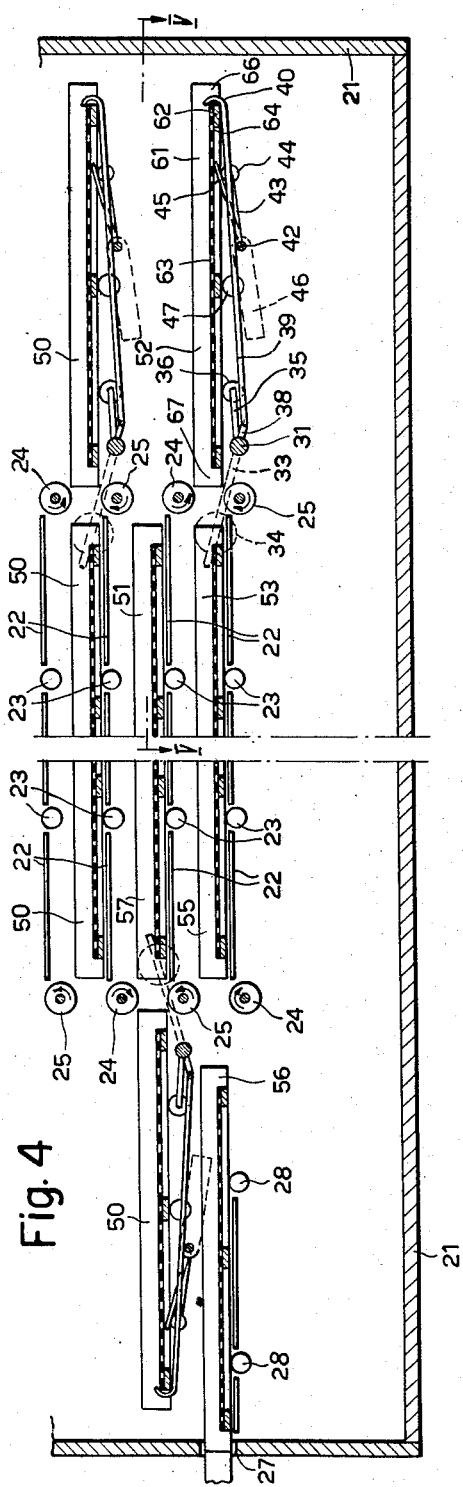
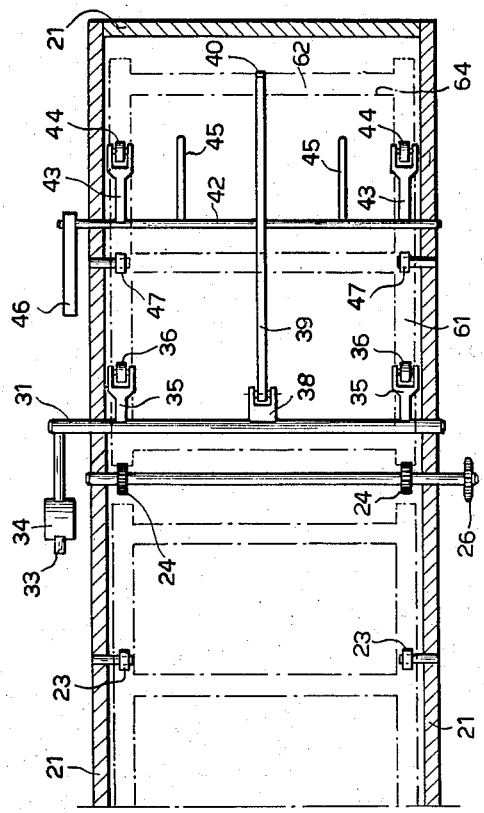
INVENTOR:
AUGUSTO MARCHETTI
BY C.P.Goepel
his ATTORNEY

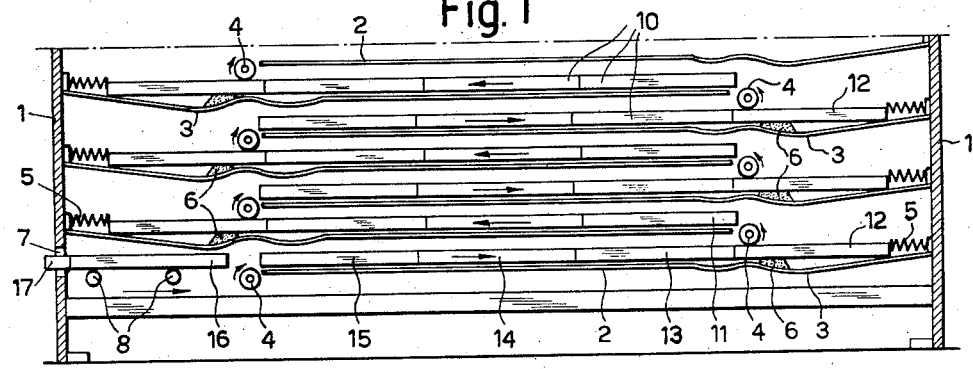
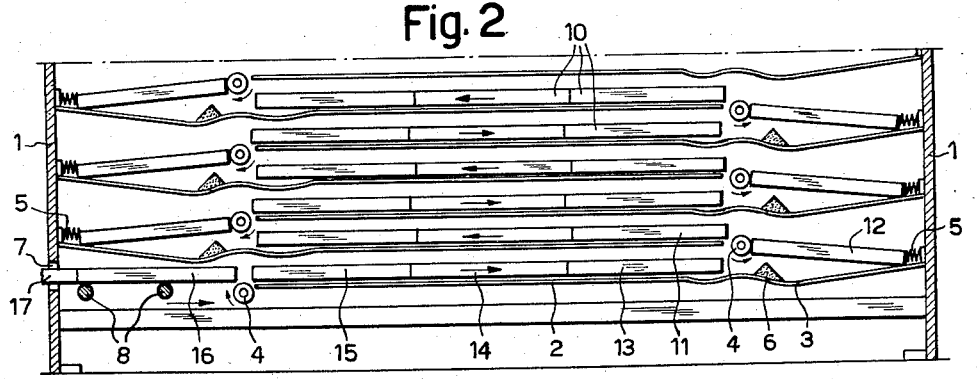
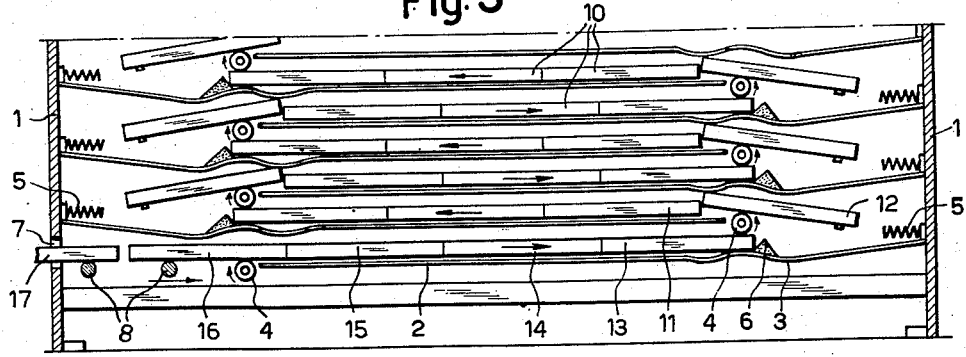

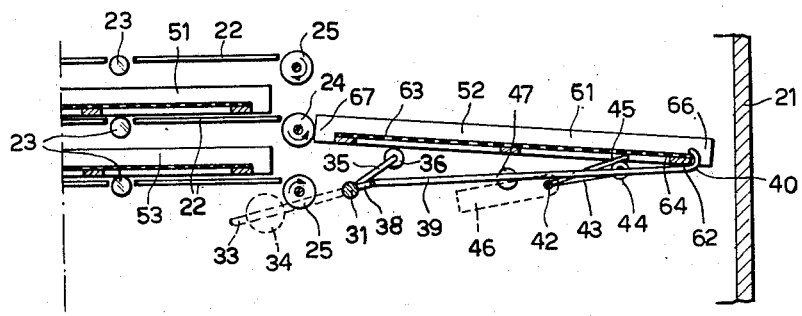
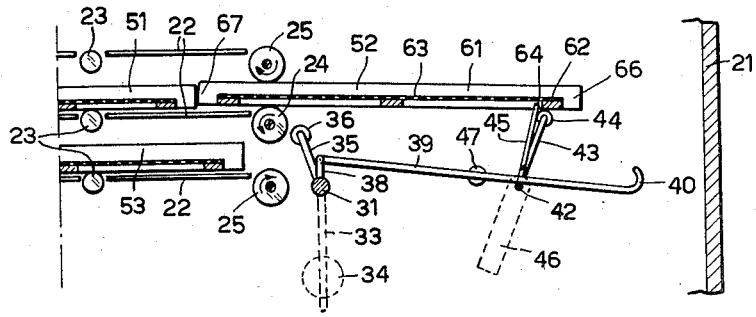
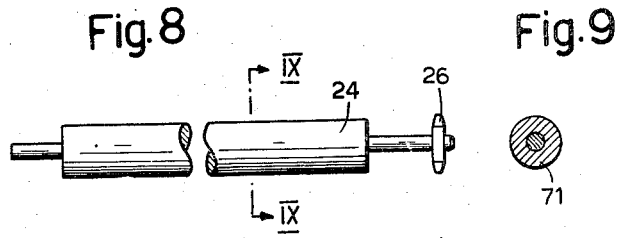
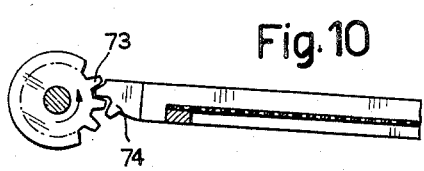

United States Patent Office 2,901,090
Patented Aug. 25, 1959

2,901,090

CARRYING-FRAME CONVEYOR FOR TIERED DRIERS

Augusto Marchetti, Milan, Italy, assignor to Gebrueder Buehler, Uzwil, Switzerland, a Swiss firm Application October 18, 1957, Serial No. 691,083

Claims priority, application Italy October 18, 1956

14 Claims. (Cl. 198—84)

My present invention relates to a conveyor for carrying frames, in particular for driers for food-paste articles such as spaghetti and the like. Such driers comprise a plurality of tiers rising one above the other and being provided with horizontal tracks for the carrying-frames. The operations of horizontal feeding of the loaded frames and raising same from one track to the other are effected simultaneously by simple mechanical elements and by a drive mechanism comprising rollers only which rotate at uniform speed.

The conveyor disclosed in the present invention is characterized in that it comprises a drive mechanism for feeding the carrying frames on their tracks, as well as energy accumulators which are loaded by the frames which leave their tracks, and which are unloaded in order to assist in raising the frames which have left their track on to the tier above, said mechanism coacting with the accumulators if necessary.

A plurality of conveyor forms according to the invention are shown in the drawings, in which—

Figs. 1 to 3 are longitudinal sections through a drier equipped with one form of conveyor, illustrating three different phases of movement of the conveyor;

Fig. 4 is a similar section through a drier equipped with a second form of conveyor, Fig. 5 is a plan view as seen from the line V—V of Fig. 4, the carrying frames being shown in dash-and-dot lines, and Figs. 6 and 7 show two further phases of movement of this form of conveyor;

Fig. 8 shows another form of drive roller, and Fig. 9 is a section on the line IX—IX of Fig. 8; and Fig. 10 shows a third form of drive roller and carrying frame.

In the housing 1 of a drier (Fig. 1) is disposed a conveyor comprising seven superposed tiers. Each tier is provided with a track 2 which is generally horizontal but at one end comprises an arcuate portion 3. At the entrance of each track 2, alternately in the front and rear drier portions, is positioned a drive roller 4 which is driven, in direction of the arrows, at uniform speed by a drive mechanism (not shown).

To each track 2 corresponds a spring 5 which is supported on housing 1. A wedge-shaped rubber block 6 provided with a friction-decreasing surface is disposed on the arcuate portion of track 2. In housing 1 is provided a feed gap 7, rearwardly of which are arranged feeding drive rollers 8 of which the peripheral speed is less than that of the drive rollers 4.

On the conveyor are moving carrier frames 10. Some of the latter, of which the movement is described below, are designated by 11 to 16. The horizontal distance between the rollers 4 is slightly greater than a multiple of the length of frames 10. The conveyor operates as follows:

In the phase of movement shown in Fig. 1, the frames 13 to 15 are motionless on the lower track. Frame 12 is driven by a roller 4 associated with the tier above against spring 5 which thus accumulates energy. Rubber block 6 has receded below frame 12 which, when it has passed roller 4 (Fig. 2), is pressed against said roller 4 by spring 5 of which the stored energy is discharged. Further, frame 12 is raised by rubber block 6. Driven at its underside by roller 4 (Fig. 3) frame 12 arrives on the track above and moves frame 11. In the meantime, frame 16, moved by the feed rollers 8, arrives on roller 4 disposed at the entrance of the lower track and moves the frames 15, 14, 13 so that frame 13 moves underneath roller 4 associated with the track above, and the sequence of movement described in connection with frame 12 is repeated.

It thus is obvious that, when one of the frames arrives on a track, it moves, under the influence of roller 4 disposed at the entrance of said track, those frames which so far were at stand-still, so that the front frame leaves the track and is raised to the track above.

In the form of invention shown in Figs. 4 to 7, are illustrated, in a housing 21, the tracks 22 of some superposed tiers on which are positioned loosely mounted rollers 23. At the beginning of each track, alternately in the front and the rear conveyor portions, is disposed a drive roller 24 which coacts with a drive roller 25 disposed at the exit of the track below. The drive rollers 24, 25 are driven through gears 26 at uniform speed by a drive mechanism (not shown). In the rear portion of housing 21 is situated a feed gap 27 and, behind same, feed drive rollers 28 of which the peripheral speed is less than that of the drive rollers 24, 25.

At the exit of the tracks 22 is situated a horizontal shaft 31 at right angles to the direction of movement in the conveyor. To shaft 31 are secured an arm 33 carrying a movable counter-weight 34, and arms 35 carrying loosely mounted rollers 36. Shaft 31, further, carries a radial lug 38 to which is pivoted a bar 39 of which the other end is bent to form a hook 40. Bar 39 rests on a second horizontal shaft 42 to which are fixed arms 43 carrying loosely mounted rollers 44. Two fingers 45 and a counter-weight 46 are also secured to shaft 42. Further rollers 47 are loosely mounted on housing 21. Carrier frames, generally designated by 50, move on the conveyor. The movement of frames 51 to 57 is described below.

The horizontal spacing of the drive rollers 24, 25 is slightly greater than a multiple of the length of frame 50. The drive rollers 25 are situated opposite the drive rollers 24 at a vertical distance from each other corresponding to the thickness of a frame 50.

In the phase of movement shown in Figs. 4 and 5, frame 52 has just passed the drive rollers 24, 25 and its front portion 66 first has depressed arms 35 and thereby raised counterweight 34 which thus has stored a certain amount of energy. After frame 52 has been supported on the rollers 47, it has depressed the fingers 45 at the end of its path. Counterweight 46 presses the rollers 44 against the undersides of the beams 61 of frame 52.

After frame 52 has passed the drive rollers 24, 25 (Fig. 6) counterweight 34 sinks and the arms 35, which act via the loosely mounted rollers 36, raise the rear portion 67 of frame 52. At the same time, lug 38 attracts bar 39 and hook 40 presses frame 52 against drive roller 24.

The drive rollers 24, 25 (Fig. 7) move frame 52 in the opposite direction, and edge 64 of crossbeam 62 bears on the fingers 45 and pivots same. The loosely mounted rollers 44 are raised thereby and, in turn, raise frame 52. The latter, upon arriving on track 22 above, shoves frame 51 and thereby lets frame 57 move from the track. Frame 57 then is raised in the same manner as frame 52. Frame 56, which in the meantime arrives on drive roller 24 positioned at the entrance of the lower track, moves frame 55 which has been at standstill, and frame 53 thus is moved between the drive roller 25 positioned at the exit of this lower track and the drive roller 24 positioned at the entrance of the track above. Frame 53 in turn then carries out the same sequence of movements as described above for frame 52.

The form of drive roller 24, 25 shown in Fig. 8 extends over the entire width of the conveyor and is provided with a lining 71 of elastic material.

To improve the drive capacity and render the drive positive, the drive roller shown in Fig. 10 is toothed at 73 and meshes with corresponding teeth 74 on the vertical sides of the frames 50.

I claim:

1. A tiered drier comprising, in combination: a lower tier and at least one upper tier; a plurality of carrier frames; substantially horizontal tracks for said frames in each tier; a drive mechanism in each tier for advancing the frames along and beyond the respective tracks; and means for lifting the frames onto the tracks of the upper tier comprising energy accumulator means located in the path of frames advancing beyond the tracks in the lower tier and adapted to be loaded by said frames to assist in lifting the latter onto the tracks in the upper tier.

2. The combination as set forth in claim 1, wherein said energy accumulator means are springs.

3. The combination as set forth in claim 1, wherein said energy accumulator means are levers in the path of said frames and counterweights attached to said levers and lifted by said frames when the latter engage with said levers while advancing beyond the tracks in the lower tier.

4. A tiered drier comprising, in combination: a lower tier and at least one upper tier; a plurality of carrier frames each having an underside, a forward end and a rear end; substantially horizontal tracks for said frames in each tier each having an entrance end and a discharge end, the entrance end of tracks in the lower tier being disposed below the discharge end of the tracks in the upper tier; a drive mechanism in each tier comprising a drive roller at the entrance end of respective tracks for engaging the undersides of and for advancing said frames along and beyond the discharge ends of respective tracks; and means in the lower tier for lifting the rear ends of said frames and for moving the undersides thereof into engagement with the drive roller in the upper tier, said last mentioned means comprising energy accumulator means located in the path of the forward ends of said frames when the latter are advanced beyond the discharge end of tracks in the lower tier and adapted to be loaded by said frames to assist in lifting of the latter onto the tracks in the upper tier.

5. The combination as set forth in claim 4, further comprising feeding means adjacent to the drive roller in the lower tier for advancing said frames onto the tracks in the lower tier at a speed less than the speed at which the frames are advanced by said drive rollers.

6. The combination as set forth in claim 4, wherein each drive roller is coated with an elastic material.

7. The combination as set forth in claim 4, wherein each frame has a toothed portion at said forward and rear ends thereof, and said drive rollers are toothed to mesh with the teeth of said frames when the latter are lifted onto the tracks in the upper tier.

8. The combination as set forth in claim 4, wherein said frames are of uniform thicknesses and each said drive mechanism further comprises a second drive roller adjacent to the discharge end of respective tracks, the second drive roller in the lower tier being vertically spaced from the first mentioned drive roller in the upper tier a distance corresponding to the thicknesses of said frames.

9. The combination as set forth in claim 8, wherein the distance between the first mentioned and the second drive roller in each of said drive mechanisms slightly exceeds the multiple of a frame length.

10. A tiered drier comprising, in combination: a lower tier and at least one upper tier; a plurality of carrier frames each having a forward end and a rear end; substantially horizontal tracks in each tier each having an entrance end and a discharge end, the discharge end of the tracks in the lower tier being below the entrance end of the tracks in the upper tier; a drive mechanism in each tier and each comprising a drive roller at the entrance end of respective tracks for engaging and advancing said frames toward and beyond the discharge end of respective tracks; and means for lifting the frames in the lower tier into engagement with the drive roller in the upper tier, said means comprising a horizontal shaft at the discharge end of and disposed at right angles to the tracks in the lower tier, an arm connected to said shaft, a counterweight connected to said shaft for constantly urging the arm into the path of each frame advancing beyond the discharge end of tracks in the lower tier whereby the arm is pivoted by the frames and lifts the counterweight, the latter being free to descend when a frame is located beyond the discharge end of tracks in the lower tier whereby the rear end of the frame is lifted by said arm, a lug connected to said shaft, and a bar having a first end articulately connected to said lug and a second end engaging with the forward end of a frame when the latter is located beyond the discharge end of tracks in the lower tier, said second end urging the rear end of the frame against the drive roller in the upper tier when the rear end of the frame is lifted by said arm.

11. The combination as set forth in claim 10, further comprising roller means connected with said arm and engaged by said frames when the latter advance beyond the discharge end of the tracks in the lower tier.

12. The combination as set forth in claim 10, further comprising means actuatable by said frames for lifting the second end of said bar together with the forward end of a frame when the rear end of the frame is lifted by said counterweight.

13. The combination as set forth in claim 12, wherein said last mentioned means comprises a rotatable second shaft parallel with said first mentioned shaft, an arm connected to said second shaft, a roller loosely mounted on said last mentioned arm and adapted to engage with the forward end of a frame, and a finger secured to said second shaft and engaging with the forward end of a frame to pivot about said second shaft when the frame is engaged by the drive roller in the upper tier whereby the forward end of the frame is lifted by said finger.

14. The combination as set forth in claim 13, further comprising a counterweight attached to said second shaft for rotating the latter with said last mentioned arm in a direction to lift the forward end of a frame located beyond the discharge end of the tracks in the lower tier.

References Cited in the file of this patent

UNITED STATES PATENTS 1,837,605    Baker _____ Dec. 22, 1931